US008886245B2

(12) United States Patent
Dayal et al.

(10) Patent No.: US 8,886,245 B2
(45) Date of Patent: Nov. 11, 2014

(54) MESSAGING SCHEME FOR CONTROLLING UPLINK TRANSMIT POWER OF A WIRELESS DEVICE

(75) Inventors: Pranav Dayal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

(21) Appl. No.: 12/040,343

(22) Filed: Feb. 29, 2008

(65) Prior Publication Data

US 2008/0220805 A1 Sep. 11, 2008

Related U.S. Application Data

(60) Provisional application No. 60/894,184, filed on Mar. 9, 2007.

(51) Int. Cl.
*H04B 7/00* (2006.01)
*H04W 52/10* (2009.01)
*H04W 52/24* (2009.01)
*H04W 52/26* (2009.01)
*H04W 52/28* (2009.01)

(52) U.S. Cl.
CPC ............ *H04W 52/10* (2013.01); *H04W 52/241* (2013.01); *H04W 52/243* (2013.01); *H04W 52/247* (2013.01); *H04W 52/26* (2013.01); *H04W 52/28* (2013.01)
USPC ........... 455/522; 455/450; 455/453; 370/229; 370/329

(58) Field of Classification Search
CPC ... H04L 1/0002; H04L 1/0025; H04L 1/0031; H04L 2025/03802; H04L 25/03343; H04B 7/0634; H04B 7/0639; H04B 7/04; H04B 7/0626; H04B 7/0641; H04W 52/10; H04W 52/08; H04W 52/146; H04W 52/225; H04W 52/243
USPC ................ 455/522, 69, 439, 450, 456.1, 423, 455/63.1, 525, 442; 370/232, 329, 229
See application file for complete search history.

(56) References Cited

U.S. PATENT DOCUMENTS 5,574,984 A 11/1996 Reed et al.
6,075,974 A 6/2000 Saints et al.
(Continued)

FOREIGN PATENT DOCUMENTS

CN 1604685 A 4/2005
CN 1860704 A 11/2006
(Continued)

OTHER PUBLICATIONS

Partial International Search Report, PCT/US08/056304, International Search Authority, European Patent Office, Jul. 29, 2008.
(Continued)

*Primary Examiner* — Golam Sorowar
(74) *Attorney, Agent, or Firm* — Charles E. Eggers

(57) ABSTRACT

In a power control messaging scheme for wireless communication, a wireless node sends vectorized information to another wireless node that uses the information to control its transmit power. In some aspects, the vectorized information may relate to interference observed at a wireless node. In some aspects, the vectorized information may relate to power adjustment offsets. In some aspects, the information may be vectorized based on one or more of different quality of service classes, different assignments within a frame, different permutation zones, different channel differences, different locations of a wireless node, different channel types, different other sector interference values, and different assignment sizes. In some aspects, a wireless node transmits a power control message via an uplink map in an assignment message.

55 Claims, 10 Drawing Sheets

(56) References Cited

U.S. PATENT DOCUMENTS

| | | | |
|---|---|---|---|
| 6,188,678 B1 | 2/2001 | Prescott | |
| 6,285,886 B1* | 9/2001 | Kamel et al. | 455/522 |
| 6,449,463 B1 | 9/2002 | Schiff | |
| 6,587,697 B2 | 7/2003 | Terry et al. | |
| 6,697,634 B1 | 2/2004 | Hayashi | |
| 6,930,993 B1* | 8/2005 | Hamada et al. | 370/347 |
| 7,043,254 B2* | 5/2006 | Chawla et al. | 455/456.1 |
| 7,983,674 B2 | 7/2011 | Julian et al. | |
| 2002/0094836 A1* | 7/2002 | Nakamura et al. | 455/522 |
| 2002/0168994 A1* | 11/2002 | Terry et al. | 455/522 |
| 2003/0016642 A1 | 1/2003 | Nakayasu | |
| 2003/0100269 A1* | 5/2003 | Lehtinen et al. | 455/69 |
| 2003/0157953 A1* | 8/2003 | Das et al. | 455/522 |
| 2004/0219943 A1* | 11/2004 | Terry et al. | 455/522 |
| 2005/0047416 A1* | 3/2005 | Heo et al. | 370/395.4 |
| 2005/0074030 A1* | 4/2005 | Cho et al. | 370/474 |
| 2005/0079865 A1* | 4/2005 | Ahn et al. | 455/434 |
| 2005/0099973 A1* | 5/2005 | Qiu et al. | 370/328 |
| 2005/0101326 A1* | 5/2005 | Kang et al. | 455/436 |
| 2005/0170786 A1* | 8/2005 | Chen et al. | 455/69 |
| 2005/0176455 A1 | 8/2005 | Krishnan et al. | |
| 2005/0288026 A1* | 12/2005 | Byun et al. | 455/442 |
| 2006/0040619 A1* | 2/2006 | Cho et al. | 455/69 |
| 2006/0083161 A1* | 4/2006 | Laroia et al. | 370/208 |
| 2006/0092875 A1* | 5/2006 | Yang et al. | 370/329 |
| 2006/0099985 A1 | 5/2006 | Whinnett et al. | |
| 2006/0142020 A1* | 6/2006 | Mueckenheim et al. | 455/453 |
| 2006/0153227 A1* | 7/2006 | Hwang et al. | 370/465 |
| 2006/0183496 A1* | 8/2006 | Muraoka | 455/522 |
| 2006/0203778 A1* | 9/2006 | Han et al. | 370/335 |
| 2006/0215559 A1* | 9/2006 | Mese et al. | 370/232 |
| 2007/0060187 A1* | 3/2007 | Englund et al. | 455/522 |
| 2007/0082620 A1* | 4/2007 | Zhang et al. | 455/69 |
| 2007/0141995 A1* | 6/2007 | Youn et al. | 455/69 |
| 2007/0153735 A1* | 7/2007 | Frederiksen et al. | 370/329 |
| 2007/0189047 A1* | 8/2007 | Lee et al. | 363/62 |
| 2007/0191015 A1* | 8/2007 | Hwang et al. | 455/442 |
| 2007/0191050 A1* | 8/2007 | Chang et al. | 455/522 |
| 2007/0217388 A1* | 9/2007 | Shiizaki et al. | 370/349 |
| 2007/0230375 A1* | 10/2007 | Yomo et al. | 370/280 |
| 2007/0287462 A1* | 12/2007 | Gorokhov et al. | 455/439 |
| 2008/0039107 A1* | 2/2008 | Ma et al. | 455/450 |

FOREIGN PATENT DOCUMENTS

| | | |
|---|---|---|
| EP | 715423 A1 | 6/1996 |
| EP | 0863619 | 9/1998 |
| EP | 1189467 | 3/2002 |
| JP | 2003032724 A | 1/2003 |
| JP | 2005501444 A | 1/2005 |
| RU | 2214069 C2 | 10/2003 |
| RU | 2233035 C2 | 7/2004 |
| WO | WO9856200 A2 | 12/1998 |
| WO | WO02056505 A1 | 7/2002 |
| WO | WO-2006138570 A2 | 12/2006 |

OTHER PUBLICATIONS

International Search Report, PCT/US08/056304, International Search Authority, European Patent Office, Nov. 17, 2008.
Written Opinion, PCT/US08/056304, International Search Authority, European Patent Office, Nov. 17, 2008.
Taiwan Search Report—TW097108229—TIPO—Aug. 4, 2011.
Taiwan Search Report—TW097108229—TIPO—Oct. 3, 2012.
IEEE Standard, Part 16, Air interface for fixed broadband wireless access systems, IEEE Standard 802.16, Oct. 1, 2004, Section 6.3.2.3, pp. 42-121 and Section 8.4.10 pp. 620-622.
IEEE Standard, Part 16, Air interface for fixed and mobile broadband wireless access systems, IEEE Standard 802.16, 2005, Section 6.3.2.3, pp. 44-172 and Section 8.4.10 pp. 636-640.

* cited by examiner

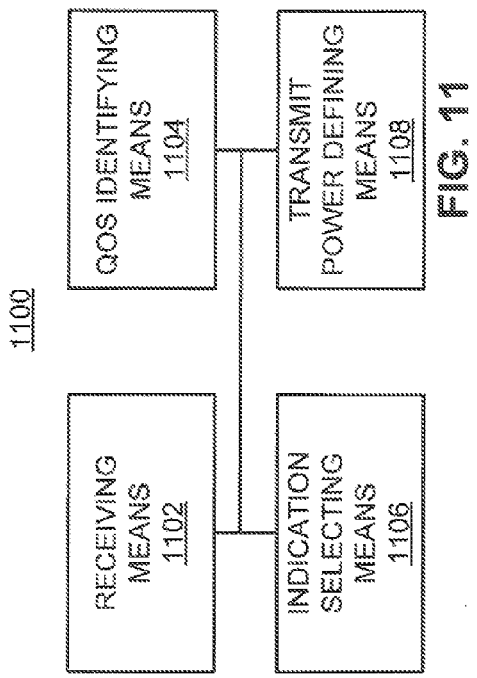
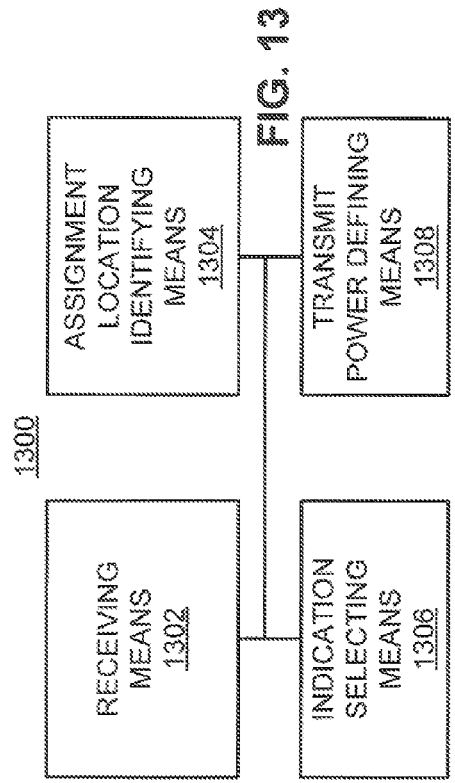
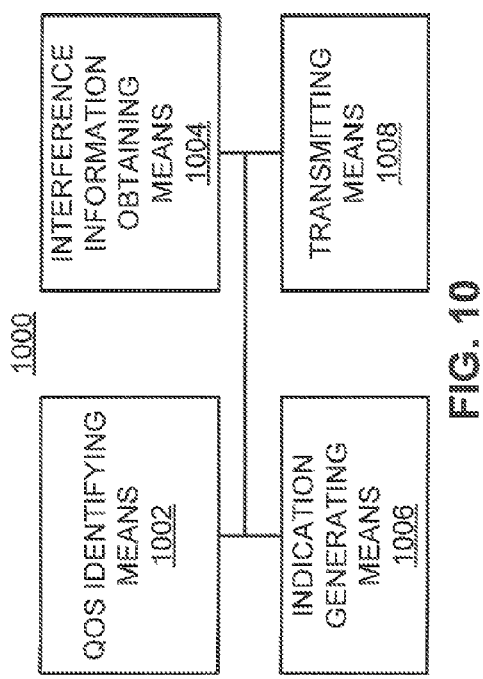
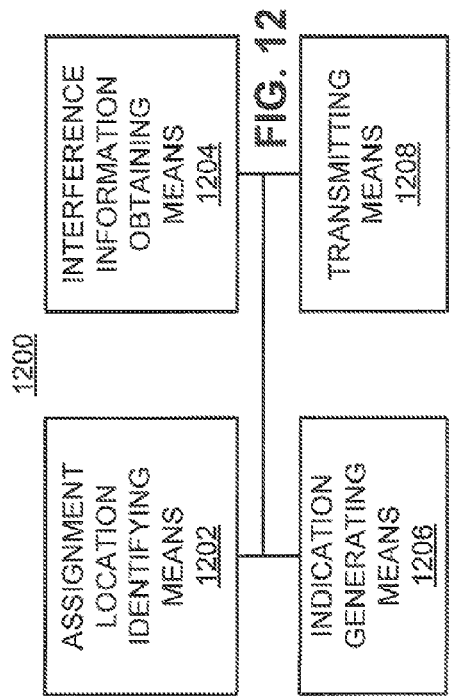

US 8,886,245 B2

MESSAGING SCHEME FOR CONTROLLING UPLINK TRANSMIT POWER OF A WIRELESS DEVICE

CLAIM OF PRIORITY UNDER 35 U.S.C. §119

This application claims the benefit of and priority to commonly owned U.S. Provisional Patent Application No. 60/894,184, filed Mar. 9, 2007, titled Method and Apparatus to Enable Low Overhead Power Control Algorithm, the disclosure of which is hereby incorporated by reference herein.

BACKGROUND

1. Field

This application relates generally to wireless communication and more specifically, but not exclusively, to a messaging scheme for controlling transmit power of a wireless device.

2. Introduction

An electronic device may support one or more communication technologies to transmit information to and receive information from other electronic devices. For example, a wireless device may support wireless technologies such as WiMAX, WiFi, and CDMA to communicate over airwaves with another device.

In a wireless device, the selection of a power level at which signals are transmitted may be based on various factors. For example, when a signal is transmitted at a higher transmission power, an associated receiving device may more readily recover any data transmitted via that signal. However, transmitting at high power levels may cause interference at neighboring wireless devices and may result in reduced battery life for the transmitting device (e.g., for a mobile device).

In view of the above, various schemes have been developed in an attempt to maintain an optimum balance between high quality transmissions and acceptable transmit power levels. For example, the IEEE 802.16 standard describes a power scheme where a subscriber station may determine transmit power for a reverse link using either a closed loop power control procedure or an open loop power control procedure. Under closed loop power control, a base station transmits power control messages to the subscriber station and the subscriber station selects the transmit power level specified by these messages. Under open loop power control, the subscriber station selects a transmit power level based on a power control equation. Here, the subscriber station may determine some of the parameters for the power control equation on its own and may obtain other parameters from the base station.

SUMMARY

A summary of sample aspects of the disclosure follows. It should be understood that any reference to the term aspects herein may refer to one or more aspects of the disclosure.

The disclosure relates in some aspects to power control for wireless communication. In particular, the disclosure relates to providing information to a wireless device that the wireless device may use to select a transmit power. For example, the wireless device may use the received information to provide one or more parameters for a power control equation.

In some aspects, a wireless device such as a base station transmits power control-related information that is vectorized based on one or more classification factors. For example, the base station may send different information for different quality of service classes, different assignments within a frame, different permutation zones, different channel differences, different locations of a wireless node, different channel types, different other sector interference values, different assignment sizes, or some combination of these classification factors. Another wireless device such as a subscriber station that receives this vectorized information may use the information associated with a particular classification factor or particular classification factors to define the transmit power for a traffic flow (e.g., uplink traffic).

In some aspects, a base station monitors interference and transmits information (e.g., NI values) relating to that observed interference to a subscriber station that uses the information to set its transmit power. Here, the base station may transmit different interference information for different classification factors (e.g., relating to different quality of service classes, different permutations zones, and so on). For example, the base station may transmit one set of interference values relating to interference observed during the transmission of traffic associated with one quality of service class. In addition, the base station may transmit another set of interference values relating to interference observed during the transmission of traffic associated with another quality of service class. Similarly, the base station may transmit one set of interference values relating to interference observed for one permutation zone, and transmit another set of interference values relating to interference observed for another permutation zone.

In some aspects, a base station transmits power control commands to a subscriber station that uses information provided by these commands to set its transit power. In some aspects, a power control message may take the form of offset information (e.g., a C/N table parameter or information used to generate an Offset_BS$_{perSS}$ parameter). In this case, the base station may transmit different offset information associated with different classification factors. For example, the base station may transmit different carrier-to-noise information based on different quality of service classes, different frame assignments, and so on.

In some aspects, a wireless device transmits a power control message to another wireless device via an assignment message. For example, the power control message may be sent via an uplink map of the assignment message.

BRIEF DESCRIPTION OF THE DRAWINGS

These and other sample aspects of the disclosure will be described in the detailed description and the appended claims that follow, and in the accompanying drawings, wherein:

FIGS. 10-17 are simplified block diagrams of several sample aspects of apparatuses configured to provide power control-related functionality as taught herein.

Figure 1:
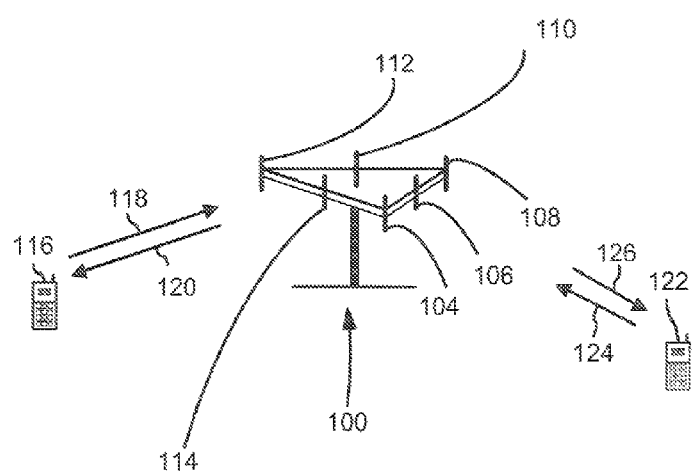
FIG. 1 is a simplified diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

For illustration purposes, the discussion that follows describes various components and operations of a wireless system where a subscriber station determines a transmit power to be used for transmissions to a base station over an uplink (also referred to herein as a reverse link). It should be appreciated that the teachings herein may be applicable to other types of wireless devices and/or communication systems.

Referring to FIG. 1, a sample multiple access wireless communication system is illustrated. A base station 100 (e.g., an access point) includes multiple antenna groups: one group including antennas 104 and 106, another group including antennas 108 and 110, and an additional group including antennas 112 and 114. In FIG. 1, only two antennas are shown for each antenna group. In practice, however, more or fewer antennas may be utilized for each antenna group. A subscriber station 116 (e.g., an access terminal) is in communication with the antennas 112 and 114, where the antennas 112 and 114 transmit information to the subscriber station 116 over a forward link 120 and receive information from the subscriber station 116 over a reverse link 118. A subscriber station 122 is in communication with the antennas 106 and 108, where the antennas 106 and 108 transmit information to the subscriber station 122 over a forward link 126 and receive information from the subscriber station 122 over a reverse link 124. In a frequency division duplex ("FDD") system, communication links 118, 120, 124 and 126 may use different frequency for communication. For example, the forward link 120 and the reverse link 118 may use different frequencies.

Each group of antennas and/or the area in which they are designed to communicate may be referred to as a sector of the base station. Thus, each antenna group may be designed to communicate to subscriber stations in a sector of the areas covered by the base station 100.

For communication over the forward links 120 and 126, the transmitting antennas of the base station 100 may utilize beam-forming to improve the signal-to-noise ratio of the forward links for the different subscriber stations 116 and 122. Also, a base station that uses beam-forming to transmit to subscriber stations scattered randomly through its coverage area may cause less interference to subscriber stations in neighboring cells than a base station that uses a single antenna to transmit to all of the subscriber stations in its coverage area.

Figure 2:
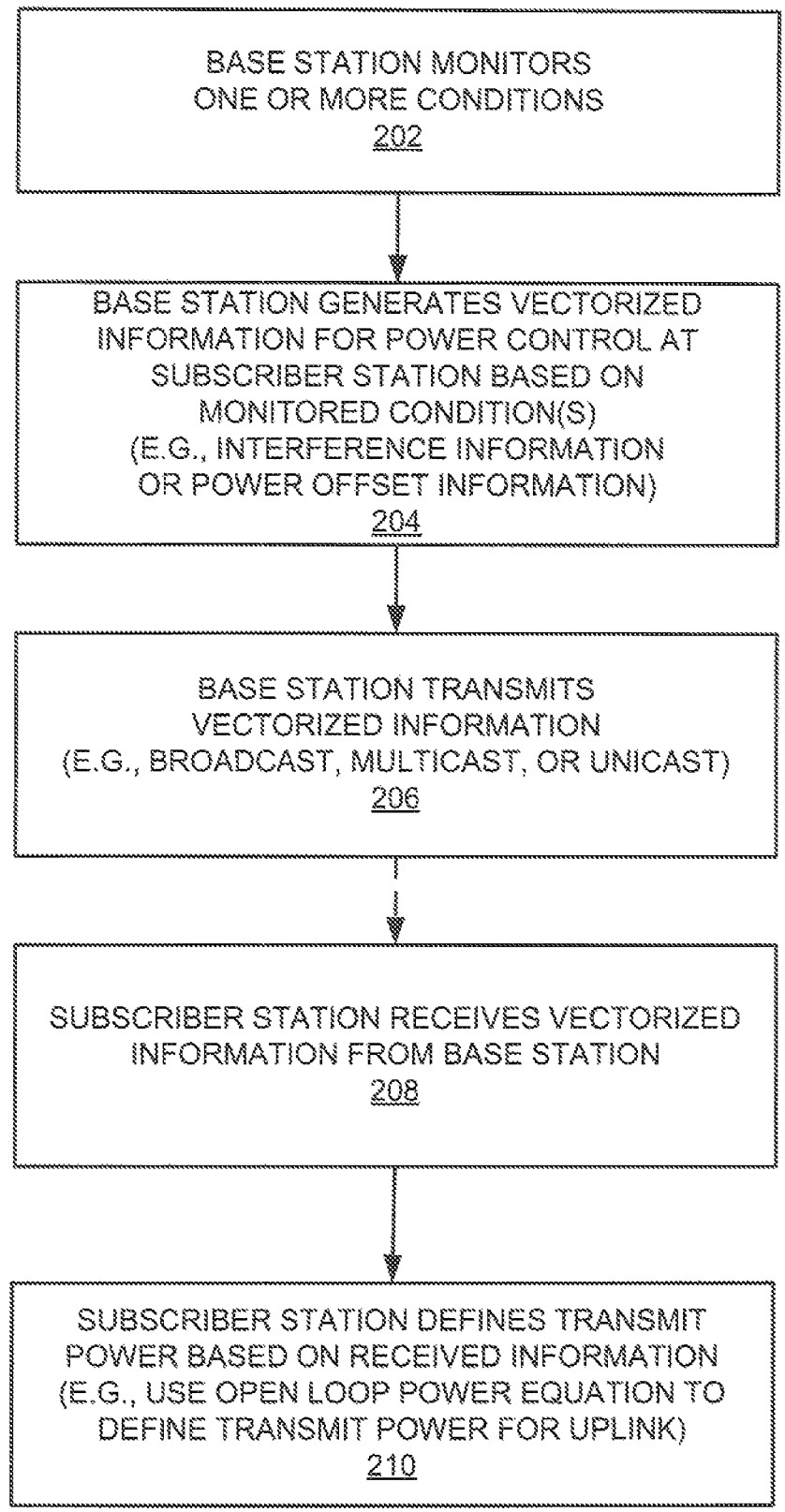
FIG. 2 is a flowchart of several sample aspects of power control operations.
Figure 3:
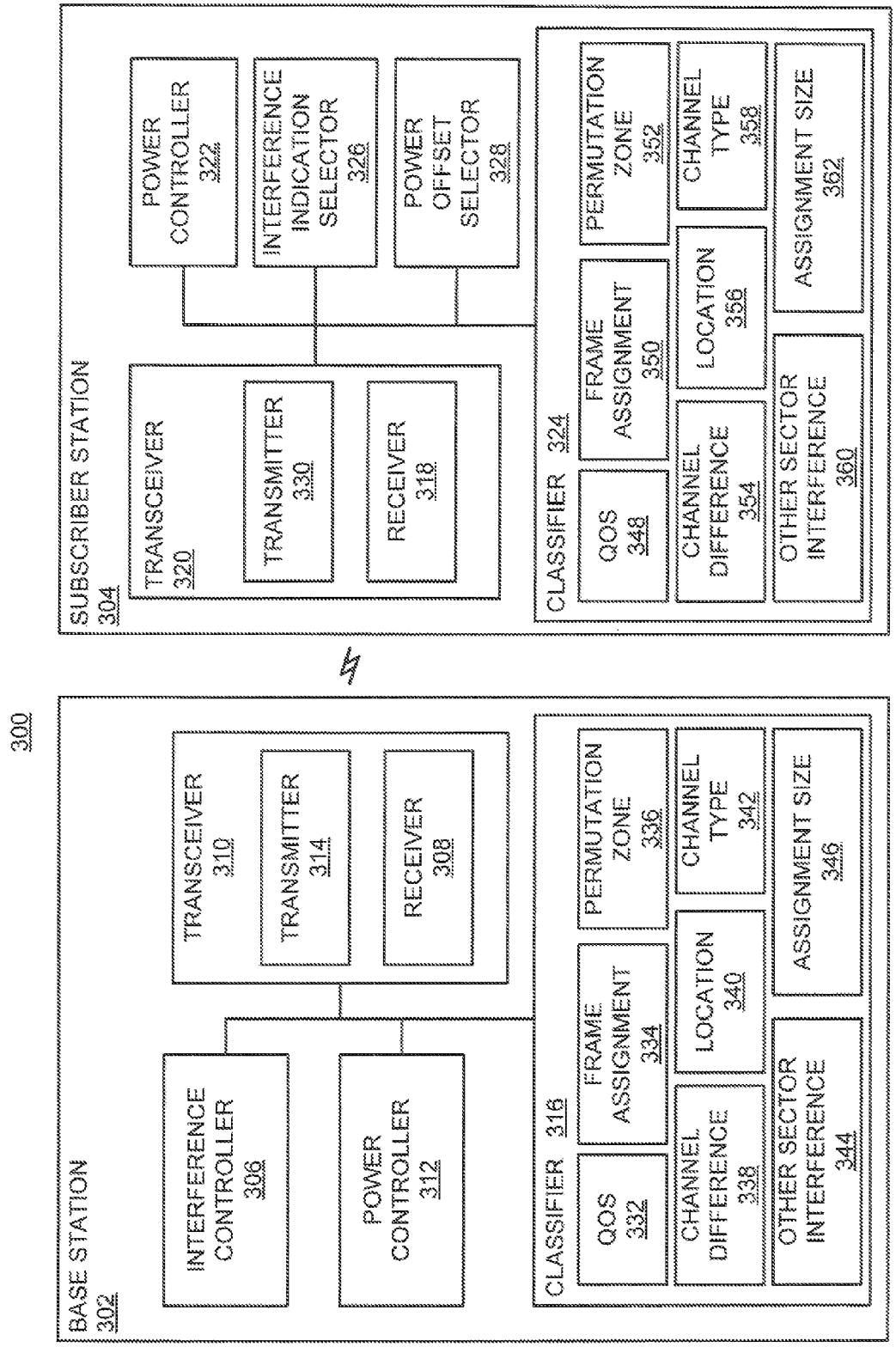
FIG. 3 is a simplified block diagram of several sample components of a communication system.
Figure 4:
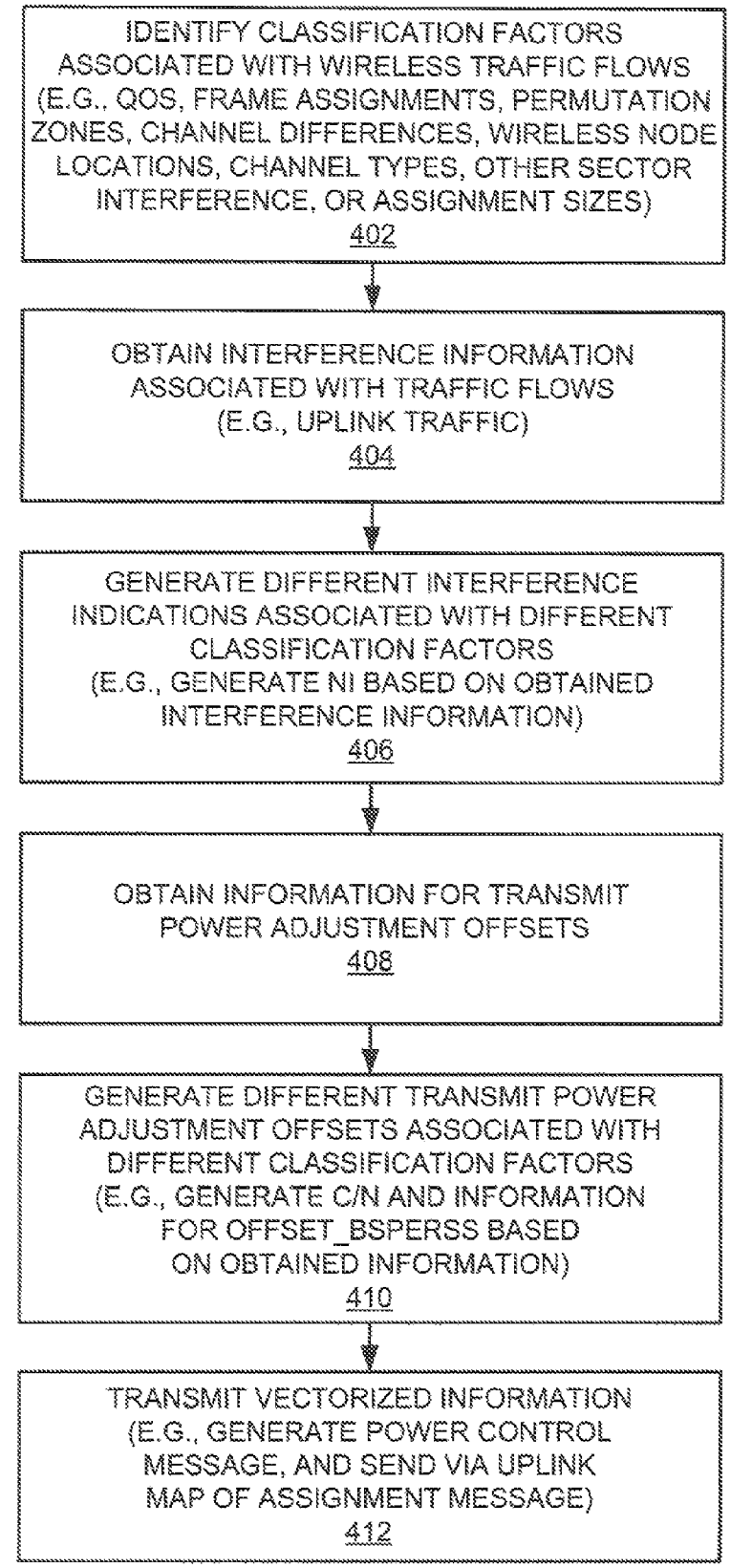
FIG. 4 is a flowchart of several sample aspects of operations that may be performed to provide power control information.
Figure 5:
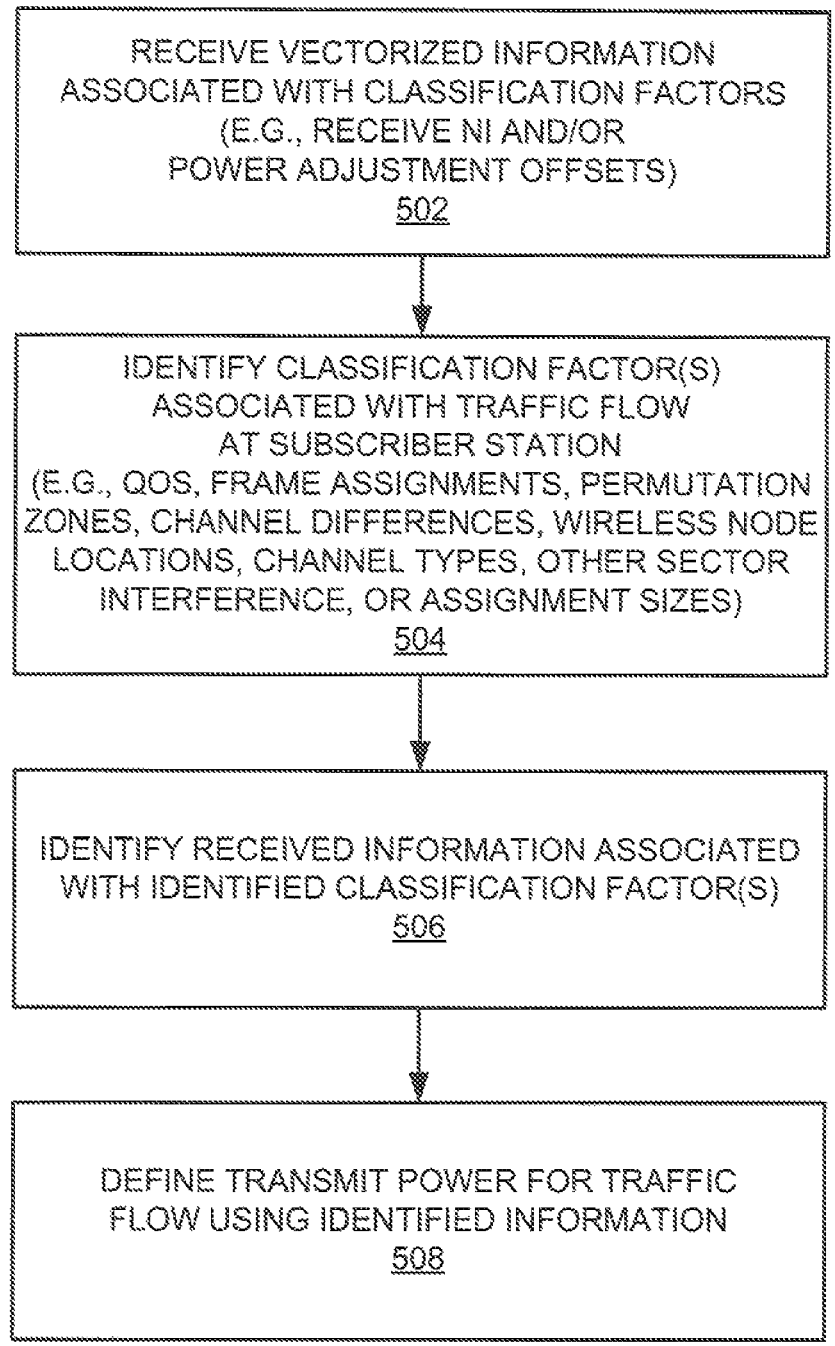
FIG. 5 is a flowchart of several sample aspects of operations that may be performed to control transmit power.

Sample power control-related operations and components of a communication system such as the system of FIG. 1 will now be described conjunction with FIGS. 2-5. Briefly, FIG. 2 illustrates how a base station and a subscriber station may cooperate to control the power at the subscriber station. FIG. 3 illustrates sample components of a base station and a subscriber station. FIG. 4 illustrates sample operations of a base station. FIG. 5 illustrates sample operations of a subscriber station.

For convenience, the operations of the flowcharts of FIGS. 2, 4, and 5 (or any other operations discussed or taught herein) may be described as being performed by specific components (e.g., components of a system 300 shown in FIG. 3). It should be appreciated, however, that these operations may be performed by other types of components and may be performed using a different number of components. It also should be appreciated that one or more of the operations described herein may not be employed in a given implementation.

Referring initially to FIG. 2, as represented by block 202, at various points in time a base station (e.g., a base station 302 of FIG. 3) monitors one or more conditions that may impact uplink transmissions. For example, an interference controller 306 of the base station 302 may determine whether any transmissions by neighboring wireless devices have interfered with or may interfere with the reception of uplink transmissions at the base station 302. Here, the base station 302 may allocate certain frequencies and time slots for a subscriber station (e.g., a subscriber station 304) to transmit to the base station 302. This allocation may be based, for example, on procedures defined by a wireless specification such as WiMAX (e.g., IEEE 802.16), Wi-Fi (e.g., 802.11), and so on. Thus, the interference controller 306 may cooperate with a receiver 308 of a transceiver 310 to monitor the designated frequencies in an attempt to quantify any interference that occurs during the time periods allocated for uplink transmissions.

As represented by block 204, the base station 302 (e.g., a power controller 312) may generate information to be sent to the subscriber station 304. As discussed below, the subscriber station 304 may use this information to control its transmit power. In some aspects the information may be based on information obtained at block 202.

The information generated at block 204 may take various forms. For example, the information may comprise an indication of interference that is based on the interference information obtained at block 202. In some implementations, this information comprises a noise and interference ("NI") value that relates to the interference observed at the base station 302.

Alternatively or in addition, the information generated at block 204 may comprise a power adjustment offset value that indicates, for example, how much the subscriber station should adjust its transmit power. For example, this information may include a carrier-to-noise ("C/N") offset table and/or information that may be used to provide an Offset_BS$_{perSS}$ parameter for an open loop power equation.

In some cases, the base station 302 may generate incremental information that is based on one or more variations in conditions (e.g., interference variations) it observes. For example, if the interference controller 306 detects an increase in interference, the power controller 312 may generate an indication that instructs the subscriber station 304 to incrementally increase transmit power. Conversely, if the interference controller 306 detects a decrease in interference, the indication may instruct the subscriber station 304 to incrementally decrease transmit power.

As will be described in more detail below in conjunction with FIG. 4, in some aspects the information generated at block 204 may be vectorized based on various classification factors (e.g., various conditions associated with the wireless transmission and/or wireless reception of information). In other words, the vectorized information may comprise different values (e.g., different NI values), each of which is associated with a particular set (e.g., one or more) of classification factors. Accordingly, the base station 302 may include a classifier component 316 that comprises various components (e.g., bit maps or active components) that are used to identify a particular classification factor or particular classification factors associated with the information to be sent to the subscriber station 304. To enable the subscriber station 304 to determine each classification factor associated with the information it receives from the base station 302, the information generated at block 204 may include an indication of the associated classification factors or factors (e.g., a bit map).

As represented by block 206, the base station 302 (e.g., a transmitter 314) transmits the information generated at block 204 at various times. For example, the base station 302 may transmit the information at regular intervals, with every transmitted frame, whenever the information changes, when other messages are sent, or at other times.

The base station 302 may transmit the information at block 206 in various ways. For example, the transmitter 314 may send the information in a broadcast message, a multi-cast message, or a unicast message. In addition, the base station 302 may include this information in another message As represented by block 208, the subscriber station 302 (e.g., a receiver component 318 of a transceiver 320) receives the information transmitted by the base station 302 at block 206. As represented by block 210, the subscriber station 304 (e.g., a power controller component 322) may then use this received information to define (e.g., specify or incrementally adjust) the transmit power of the subscriber station 304.

As mentioned above, the received information may comprise various vectors of information each of which is associated with a particular set of classification factors. In a similar manner, a traffic flow (e.g., a flow of traffic associated with a given connection) of the subscriber station 304 may be associated with a particular set of classification factors. Consequently, the power controller 322 may be configured to determine which vector of received information is associated with the same classification factor set as the traffic flow. To this end, the subscriber station 304 may include a classifier component 324 that identifies the classification factors associated with a given traffic flow of the subscriber station 304. Once the appropriate vector is identified, the subscriber station 304 may use that vector of information to control the transmit power for that traffic flow.

In some cases, the subscriber station 304 may employ an open loop power equation to determine the transmit power it will use for an uplink transmission. In these cases, at block 210 the subscriber station 304 determines the open loop power equation parameters to be used to calculate transmit power. In some implementations this power equation takes the form of Equation 1:

$$P = L + C/N + NI - 10 \log_{10}(R) + \text{Offset\_SS}_{perSS} + \text{Offset\_BS}_{perSS} \quad (1)$$

A brief description of the parameters of Equation 1 follows. P is the transmit power spectral density in dBm. L is the forward link path loss (e.g., an estimate of the path loss). C/N is a carrier-to-noise offset for the selected coding scheme (e.g., the selected modulation/FEC rate). NI is an estimated average power level in dBm of noise and interference at the base station. R is the repetition rate (e.g., for the selected modulation/FEC rate). $\text{Offset\_SS}_{perSS}$ is an offset parameter provided by the subscriber station 304 (e.g., adjusted depending on the errors seen by the subscriber station 304). $\text{Offset\_BS}_{perSS}$ is an offset parameter maintained at the subscriber station 304 that is based on information provided by the base station 302. For example, an $\text{Offset\_BS}_{perSS}$ value may represent the accumulation of all power control commands collected by the subscriber station 304 in conjunction with the receipt of various power control messages (e.g., as defined by the IEEE 802.16 standard). As will be discussed in more detail below, this offset parameter may be based, at least in part, on information received at block 208.

The subscriber station 304 may use the power equation to determine the transmit power for the reverse link (uplink) on a repeated basis. For example, the subscriber station 304 may recalculate the transmit power whenever it receives a power control message from the base station 302.

Referring now to FIG. 4, several operations that the base station 302 may perform to provide vectorized information will now be described in more detail. In a typical implementation, the base station 302 will perform one or more of these operations on a repeated basis. For example, the base station 302 may generate vectorized information whenever it detects a variation in interference. In this case, the procedure may be limited in some manner to prevent the operation from being performed too frequently. In some implementations the base station 302 may generate vectorized information every time it transmits data (e.g., every frame) or expects to receive data. In some embodiments the base station 302 may periodically generate the vectorized information.

As mentioned above, the base station 302 may provide power control-related information that is vectorized based on one or more classification factors. For example, the interference observed for traffic associated with one classification factor (e.g., one permutation zone) may be different than the interference observed for traffic associated with another classification factor (e.g., a different permutation zone). The base station 302 may thus provide vectorized indications of interference, each of which corresponds to the interference associated with a different one of the classification factors. In this way, a subscriber station whose transmissions are associated with a particular classification factor, may adjust its transmit power based on a received indication of interference that is specific to that classification factor. Thus, this approach may provide more effective power control as opposed to, for example, an approach that uses a single indication of interference that relates to all interference observed at a base station.

Accordingly, as represented by block 402, the base station 302 (e.g., the classifier 316) identifies the classification factors associated with different wireless traffic flows (e.g., the flows that are currently being handled by the base station 302). Such classification factors may include, for example, a quality of service class associated with a traffic flow, a frame assignment for a traffic flow, a permutation zone assigned to a traffic flow, channel differences at a wireless node, the location of a wireless node, the type of channel provided by a traffic flow, other sector interference at a wireless node, or an assignment size associated with a traffic flow. Each of these factors will be discussed in turn.

In some cases the base station 302 may vectorize information based on quality of service classes. To this end, the classifier 316 may comprise a quality of service ("QoS") component 332 that identifies (e.g., defines or determines) the quality of service classes associated with different traffic flows. In some implementations a quality of service class may relate to, for example, a certain level of throughput or a particular latency. For example, one traffic flow (e.g., voice traffic) may have relatively strict latency requirements while another traffic flow (e.g., best effort traffic such as e-mail and web browsing) may not have such strict latency requirements. Similarly, different traffic flows (e.g., video traffic and audio traffic) may have different throughput requirements.

The above vectorization scheme may be used, for example, where it is desirable to separately adjust transmit power for different traffic flows associated with these different quality of service classes. For example, some quality of service classes may be more adversely affected by interference than other classes. In addition, the traffic associated with different quality of service classes may experience different levels of interference. Hence, as discussed below, the base station 302 may separately acquire information (e.g., interference information) associated with the different quality of service classes to provide information that is vectorized (e.g., different NI values) according to the difference classes. Upon receipt of this vectorized information, the subscriber station 304 may select the appropriate information vector to adjust the transmit power for traffic associated with a particular quality of service class.

In some cases the base station 302 may vectorize information based on assignments within a frame. To this end, the classifier 316 may comprise a frame assignment component 334 that identifies (e.g., defines or determines) the frame assignments associated with different traffic flows (e.g., uplink frames). In some implementations a frame assignment may relate to, for example, an assignment within a given permutation zone. For example, a particular set of sub-carriers and symbols (or timeslots) within a frame may be assigned to a given IEEE 802.16 permutation zone. In addition, various assignments may be made within the permutation zone to define, for example, certain traffic flows of that permutation zone.

Figure 6:
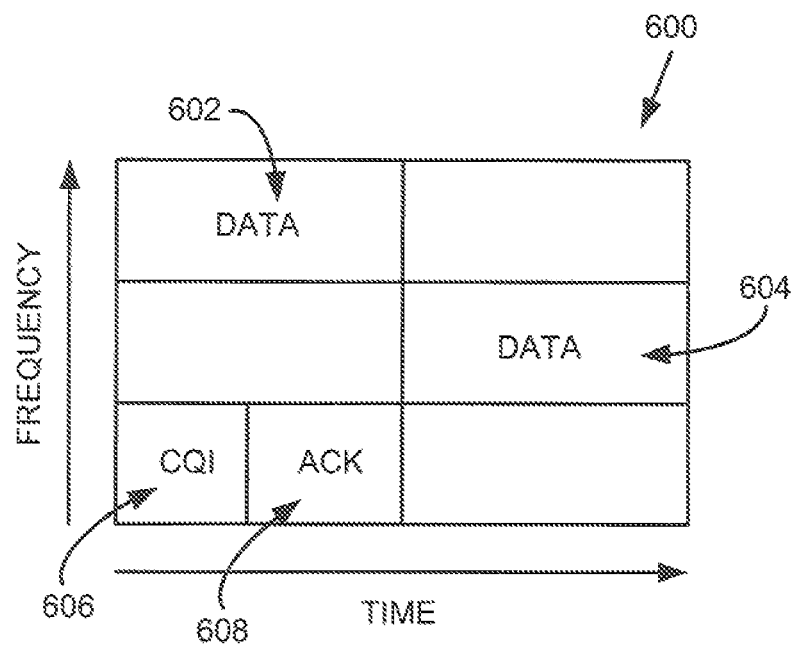
FIG. 6 is a simplified diagram of sample assignments within a permutation for a frame.

FIG. 6 illustrates an example of a permutation zone 600 (e.g., defined within a WiMAX frame). In this case, different assignments 602, 604, 606, and 608 relate to different subsets of the sub-carriers (vertical axis) and symbols or timeslots (horizontal axis) designated for that permutation zone. It should be appreciated that various types of zones (e.g., including permutation zones) may be defined to allocate wireless resources and that these zones may be used for vectorization as taught herein. Such zones may be based on, for example, one or more of a time dimension (e.g., timeslots), a frequency dimension (e.g., sub-carriers), a space dimension (e.g., position), and code a dimension (e.g., communication coding).

This vectorization scheme may be used, for example, where it is desirable to separately adjust transmit power for different traffic flows associated with these different frame assignments. For example, traffic flows associated with some frame assignments may be more adversely affected by interference than traffic flows associated with other frame assignments. In addition, the traffic associated with different frame assignments may experience different levels of interference (e.g., due to interference from frequency division duplexed control channels). Hence, the base station 302 may separately acquire information (e.g., interference information) associated with the different frame assignments to provide information that is vectorized (e.g., different NI values) according to the different frame assignments. Upon receipt of this vectorized information, the subscriber station 304 may select the appropriate information vector to adjust the transmit power for traffic associated with a particular frame assignment.

In some cases the base station 302 may vectorize information based on different permutation zones (e.g., IEEE 802.16 permutation zones). In this case, a permutation zone component 336 may identify the permutation zones associated with different traffic flows. As mentioned above, a particular set of sub-carriers and symbols (or timeslots) within a frame may be assigned to a given permutation zone.

Figure 7:
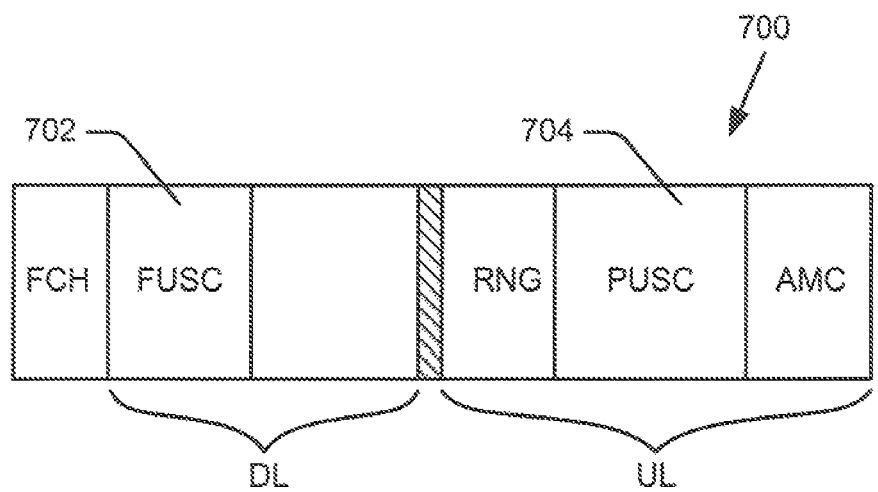
FIG. 7 is a simplified diagram of sample permutation zones of a frame.

FIG. 7 depicts a simplified example of a frame 700 defining various permutation zones. Specifically, a full usage of sub-channels ("FUSC") permutation zone 702 is defined for a downlink ("DL") portion of the frame 700, while a partial usage of sub-channels ("PUSC) permutation zone 704 is defined for an uplink ("UL") portion of the frame 700. It should be appreciated that multiple permutations zones may be defined within the frame 700 (e.g., for either or both of the UL or DL portions). In addition, other types of permutation zones (e.g., an optional PUSC) or other zones such as a ranging ("RNG") zone and an adaptive modulation coding ("AMC") zone may be defined within the frame 700 and used for vectorization.

The above vectorization scheme may be used, for example, where it is desirable to separately adjust transmit power for different traffic flows associated with these different permutation zones. For example, traffic flows (e.g., control) associated with some permutation zones may be more adversely affected by interference than traffic flows (e.g., data) associated with other permutation zones. In addition, the interference observed in one permutation zone may be different than the interference observed in another permutation zone. Hence, the base station 302 may separately acquire information (e.g., interference information) associated with the different permutation zones to provide information that is vectorized (e.g., different NI values) according to the different permutation zones. Upon receipt of this vectorized information, the subscriber station 304 may select the appropriate information vector to adjust the transmit power for traffic associated with a particular permutation zone.

In some cases the base station 302 may vectorize information based on channel differences. In this case, a channel difference component 338 may identify the channel differences associated with different wireless nodes and/or traffic flows. Here, a channel difference may relate to a difference between a path loss to or from a serving sector (e.g., of an associated base station) and a path loss to or from another sector. In some cases, the channel difference for a given wireless node may depend on the location of the wireless node within a given sector. For example, a wireless node located near an edge of the sector may have a relatively small channel difference while a wireless node located near the center of the sector may have a relatively large channel difference.

Such a vectorization scheme may be used, for example, where it is desirable to separately adjust transmit power for different traffic flows to and/or from the wireless node associated with these channel differences. For example, when attempting to compensate for uplink interference, the transmit power of a first wireless node that has a relatively small channel difference may not be increased as much as the transmit power of a second wireless node that has a relatively large channel difference. This may be done, for example, to reduce the likelihood of transmissions from the first wireless node interfering with reception by a wireless node of a neighboring sector.

Thus, in this case, the base station 302 may provide information that is vectorized (e.g., different power offset values) according to the different channel differences. For example, when attempting to increase transmit power, a relatively small power offset value may be associated with a small channel difference and a relatively large power offset value may be associated with a larger channel difference.

In some cases the base station 302 may vectorize information based on location information. For example, a location component 340 may identify the location of a wireless node associated with a particular traffic flow. Such a vectorization scheme may be used, for example, where it is desirable to separately adjust transmit power for different traffic flows to and/or from wireless nodes at different locations. For example, a first wireless node that is located in a high congestion area (e.g., an apartment building) may be controlled in a different manner than a second wireless node that is located in a low congestion area (e.g., a rural area). Here, when attempting to reduce the likelihood that transmissions by the first wireless node will interfere with reception by a neighboring wireless node, the transmit power of the first wireless node may not be increased as much as it otherwise would in a case where the node is located in a low congestion area.

In the above example, the base station 302 may therefore provide information that is vectorized (e.g., different power offset values) according to the different locations. For example, a relatively small power offset value may be associated with one location and a relatively large power offset value may be associated with another location.

In some cases the base station 302 may vectorize information based on channel type. For example, a channel type component 342 may identify the type of channel provided by a traffic flow. Various channel types may be employed here. For example, different logical channel types may include an acknowledgement channel, a channel quality indication ("CQI") feedback channel, a ranging channel, and a data channel. Such a vectorization scheme may be used, for example, where it is desirable to separately adjust transmit power for different types of channels. For example, when interference is present in an uplink channel, to ensure the reliability of certain types of control channels (e.g., an acknowledgement channel) it may be desirable to use higher transmit power for those channels than for other types of control channels (e.g., a CQI channel). Thus, the base station 302 may provide information that is vectorized (e.g., different NI or power offset values) according to the different channel types. For example, separate NI values may be provided for the acknowledgement, CQI, ranging, and data channels.

In some cases the base station 302 may vectorize information based on other sector interference. For example, an other sector interference component 344 may identify other sector interference associated with different wireless nodes and/or traffic flows. Here, other sector interference may relate to interference a given node receives from another sector or causes at another sector. As an example of the latter case, when a base station is attempting to compensate for uplink interference by sending a message requesting an increase in transmit power at a subscriber station, the base station may not increase the transmit power of a first subscriber station that causes significant other sector interference as much as the base station may increase the transmit power of a second subscriber station that does not cause significant other sector interference. Thus, this vectorization scheme may be used to separately adjust transmit power for different traffic flows based on the other sector interference associated with a wireless node that transmits or receives those traffic flows.

In some cases the base station 302 may vectorize information based on assignment size. Here, an assignment size component 346 may identify sizes relating to, for example, the frame assignments described above. For example, an assignment size may relate to the number of frequency tones designated by a given assignment. The vectorization scheme may thus be used to separately adjust transmit power for different traffic flows based on the assignment size associated with those traffic flows. For example, when an assignment is associated with a large assignment size, more transmit power may be required to meet a designated power spectral density for the associated traffic. Thus, a larger power offset value (e.g., as provided by a C/N table) may be associated with a larger assignment size and a smaller power offset value may be associated with a smaller assignment size.

Referring again to FIG. 4, at blocks 404-410 the base station 302 obtains (e.g., generates or acquires) information and generates vectorized information that is based on the acquired information. Specifically, blocks 404 and 406 relate to obtaining interference information and generating vectorized interference indications based on that obtained information. Similarly, blocks 408 and 410 relate to obtaining information for defining power offsets and generating vectorized power adjustments offset commands based on that obtained information. In various embodiments, a base station may perform either or both of these sets of operations.

Referring initially to blocks 404 and 406, as represented by block 404 the interference controller 306 obtains interference information associated with various traffic flows. Here, the base station 302 may determine whether it is experiencing any interference, and if so, the extent of that interference. For example, the interference controller 306 may monitor designated sub-carriers on a repeated basis during the time periods designated for uplink traffic. In addition or in the alternative, in some cases the base station 302 may estimate interference in an indirect manner (e.g., based on a received data error rate).

As mentioned above, the interference controller 306 may obtain different interference information associated with different classification factors. For example, the various components of the classifier 316 discussed above may identify (e.g., define or acquire) the classification factor(s) associated with various traffic flows. The interference controller 306 may then obtain the interference information for each traffic flow and associate that information with the corresponding set of classification factors (e.g., using a bit map).

In some aspects, the interference controller 306 may determine whether there is a variation in the interference observed at the base station 302 relative to previously observed interference. For example, at a given point in time the base station 302 may measure the magnitude (e.g., power level) of the interference currently observed by the base station 302 and designate this magnitude as a baseline level. The base station 302 may then continue monitoring to determine whether there are any variations in the magnitude of the observed interference relative to the value of the baseline level. This variation in interference may then be used at block 406 to define an incremental interference indication.

As represented by block 406, the base station 302 may generate vectorized interference-related indications to be sent to the subscriber station 304. For example, the interference controller 306 may generate several NI values, each of which is associated with a different one of the sets of classification factors. Here, each NI value may be generated based on the interference information obtained at block 304 that is associated with the corresponding set of classification factors. As mentioned above, in some cases the interference controller 306 may generate an indication that specifies an incremental change relative to the last indication that was generated or relative to a baseline value.

Figure 8:
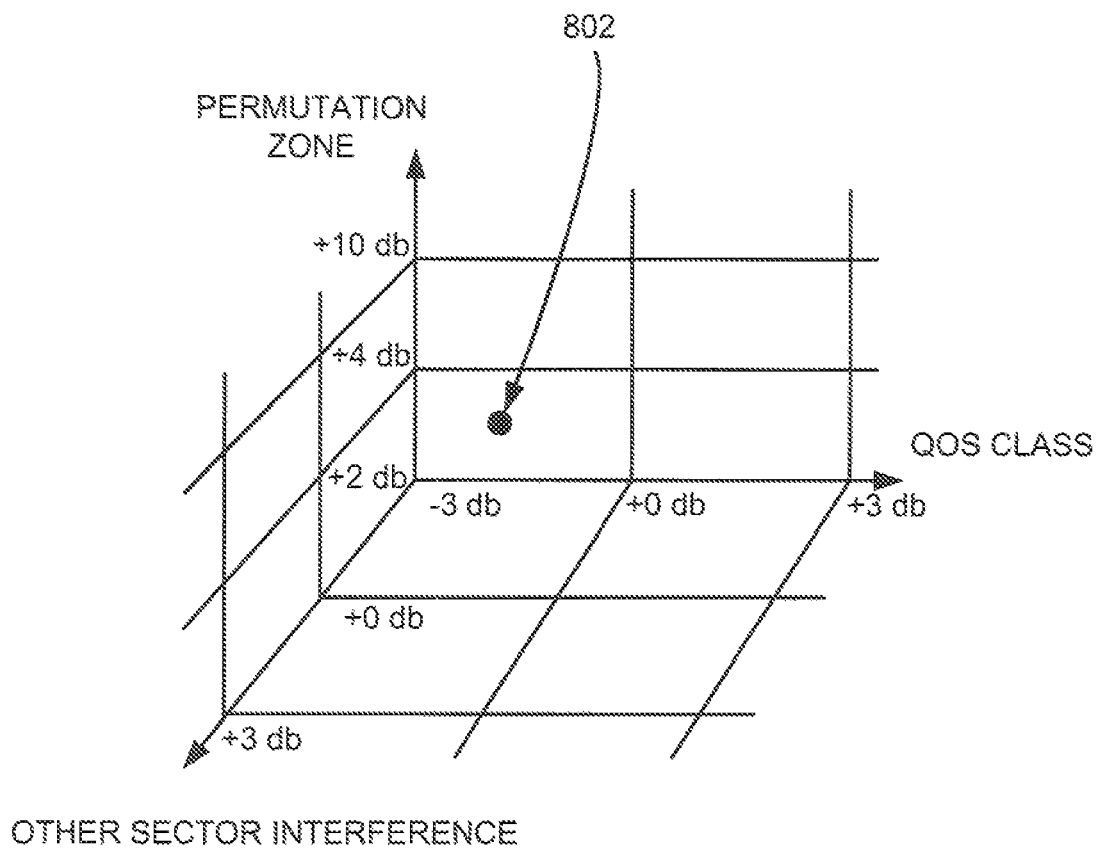
FIG. 8 is a simplified diagram of illustrating a sample dependency of a vectorized indication on various classification factors.

Here, it should be appreciated that the interference indication (or any other indication or message taught herein) may be dependent on multiple classification factors. For example, as represented by FIG. 8, an NI value 802 may depend on the associated quality of service class, other sector interference, and permutation zone.

Referring now to blocks 408 and 410, as represented by block 408 the base station 302 obtains information used to define vectorized power offset values. In some cases, this information is the same interference information obtained at block 404. For example, a C/N offset may be adjusted based on the current level of interference observed by the interference controller 306. Also as discussed at block 404, different information may be obtained at block 408 corresponding to different sets of classification factors.

As represented by block 410, the base station 302 (e.g., the power controller 312) generates power control messages (e.g., transmit power adjustment offset information) to be sent to the subscriber station 304. This information may include, for example, a C/N table or information that the subscriber station 304 uses to define the Offset_$BS_{perSS}$ offset parameter. In a similar manner as discussed above, these messages may be based on the vectorized information obtained at block 408 such that different messages (e.g., offset values) correspond to different sets of classification factors. For example, the C/N table for each packet format supported by the system may include separate entries for different quality of service classes (e.g., to target different terminations), different frame assignments, different channels differences (e.g., to limit interference to nearby sectors), different interference observed at the base station 302, different assignment sizes (e.g., to meet maximum power constraints), and so on.

As represented by block 412, the base station 302 transmits the vectorized information to the subscriber station 304 (e.g., via one or more messages). Such a message may take various forms. In some implementations, the message may comprise a unicast message specifically directed to the subscriber station 304 (e.g., via an information element). In some implementations the message may comprise a dedicated power control message. In some implementations a non-power-specific message may be used to send a power control indication along with other information. For example, C/N table information may be sent via a downlink channel descriptor ("DCD") message.

In some implementations the base station 302 transmits a power control message to the subscriber station 304 via an assignment message. For example, the power control message (e.g., the vectorized incremental power adjustment values) may be included in an uplink map. The uplink map, in turn, may be included in an assignment message for uplink transmission that the base station 302 sends to the subscriber station 304. Such an uplink map may be employed, for example, in systems where modulation coding schemes have associated defined (e.g., predefined) power levels. Here, the uplink map may define, for example, which timeslots the subscriber station 304 may use and modulation coding scheme information.

The base station 302 may send an assignment message at various times. For example, in some implementations the base station 302 sends an assignment message with every transmitted frame.

In some aspects, the base station 302 may save power by sending the power control message with another message rather than as a separate message (e.g., a separate unicast power control message). For example, in this case the base station 302 may transmit the corresponding connection identifier ("CID") in one periodic message instead of two periodic messages.

Power savings also may be achieved in some implementations through the use of a compressed power control message. For example, rather than using a full-sized CID (e.g., 16 bits), a technique may be employed whereby the wireless devices in a system uniquely identify one another through the use of reduced CIDs (e.g., 7 bits). In some implementations this technique may be used for a power control message that is transmitted independently of other messages that provide a CID (in some cases these other messages also may employ a reduced CID). In some implementations this technique may be used for another message (e.g., an assignment message) that includes a power control message as discussed above.

Referring now to FIG. 5, several operations that the subscriber station 304 may perform to control transmit power for a flow of traffic (e.g., a given connection) will be described in more detail. As represented by block 502, the subscriber station 304 receives the vectorized information sent by the base station 302 as discussed above.

As represented by block 504, the power controller 322 determines which classification factor is or which classification factors are associated with the traffic flow. To this end, the classifier component 324 may include several components (e.g., bit maps or active components) that identify the classification factor(s) associated with a given traffic flow of the subscriber station 304. Thus, components 348, 350, 352, 354, 356, 358, 360, and 362 may perform operations that are similar to the operations performed by the components 332, 334, 336, 338, 340, 342, 344, and 346, respectively, as discussed above in conjunction with block 402.

As represented by block 506, the subscriber station 304 determines which vector of received information is associated with the same classification factor set as the traffic flow. To this end, the subscriber station 304 may include an interference indication selector 326 that identifies the received interference indication vector that is associated with the classification factor(s) identified at block 504 (i.e., the classification factor set associated with the traffic flow). Similarly, the subscriber station 304 may include a power offset selector 328 that identifies the received power control message vector (e.g., power adjustment offset value) that is associated with the classification factor(s) identified at block 504 (i.e., the classification factor set associated with the traffic flow).

As represented by block 508, the power controller 322 defines the transmit power (e.g., the power spectral density) for the traffic flow using the vector identified at block 506. A transmitter 330 of the subscriber station 304 may thus transmit information (e.g., for a corresponding traffic flow) based on a power spectral density defined at block 508. These operations may thus be similar to the operations described above in conjunction with block 210.

A wireless communication system as taught herein may be deployed to provide various types of communication content such as voice, data, and so on. Such a system may comprise multiple-access systems capable of supporting communication with multiple users by sharing the available system resources (e.g., bandwidth and transmit power). Examples of such multiple-access systems include code division multiple access ("CDMA") systems, time division multiple access ("TDMA") systems, frequency division multiple access ("FDMA") systems, 3GPP LTE systems, orthogonal frequency division multiple access ("OFDMA") systems, and so on.

A wireless multiple-access communication system may simultaneously support communication for multiple wireless terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, or a multiple-in-multiple-out ("MIMO") system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables an access point to extract transmit beam-forming gain on the forward link when multiple antennas are available at the access point.

Figure 9:
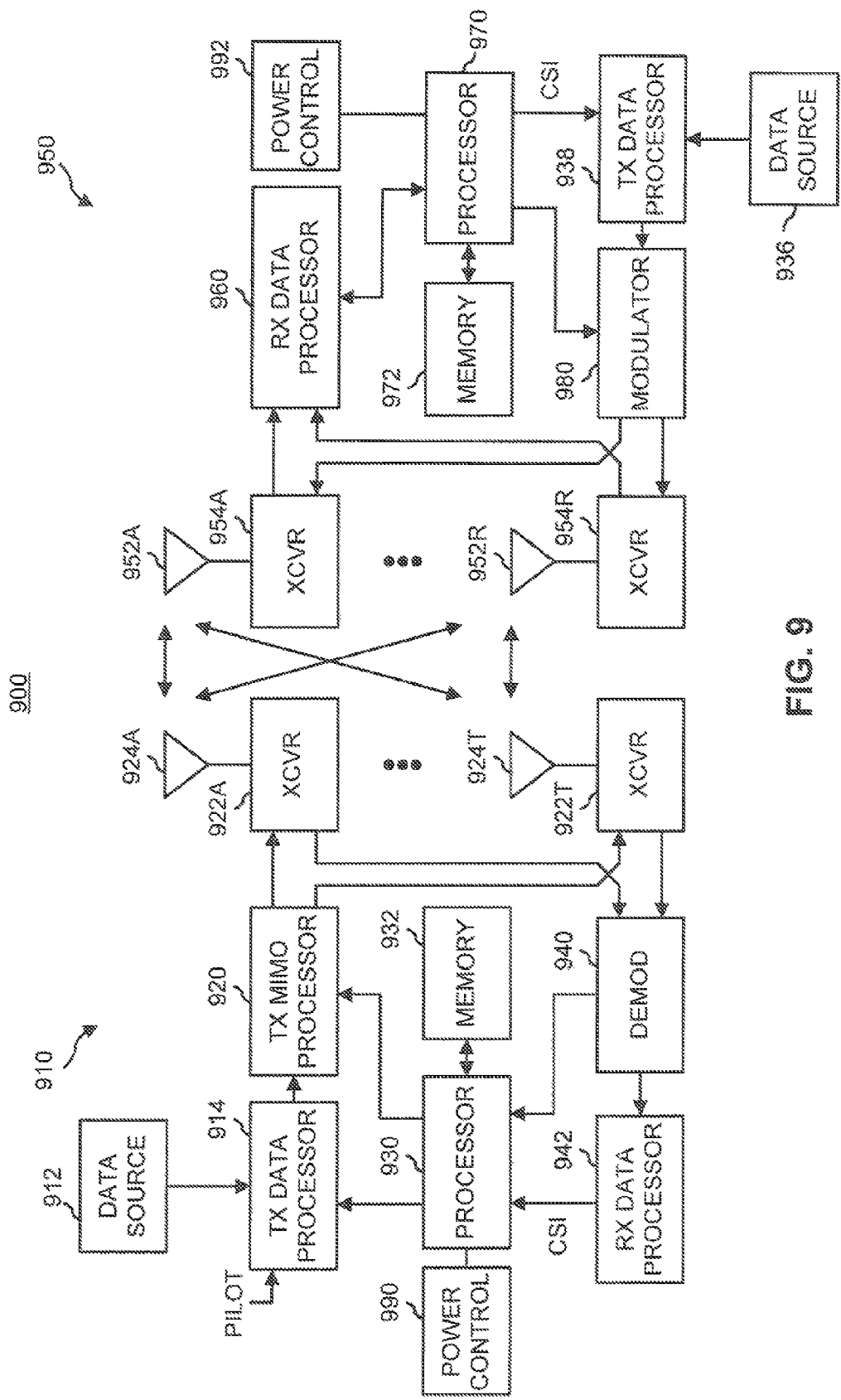
FIG. 9 is a simplified block diagram of several sample aspects of wireless devices of a communication system.
Figure 15:
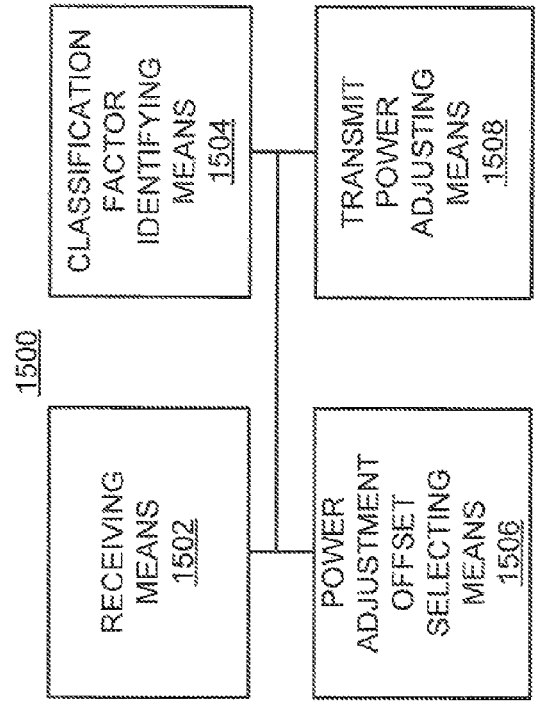
Figure 17:
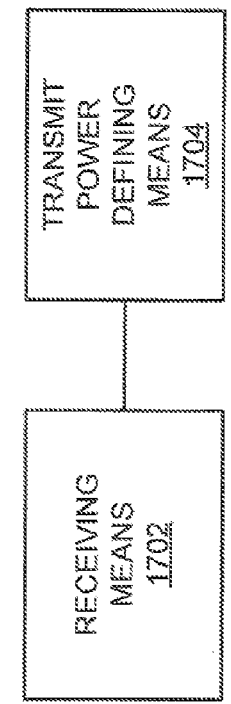
Figure 14:
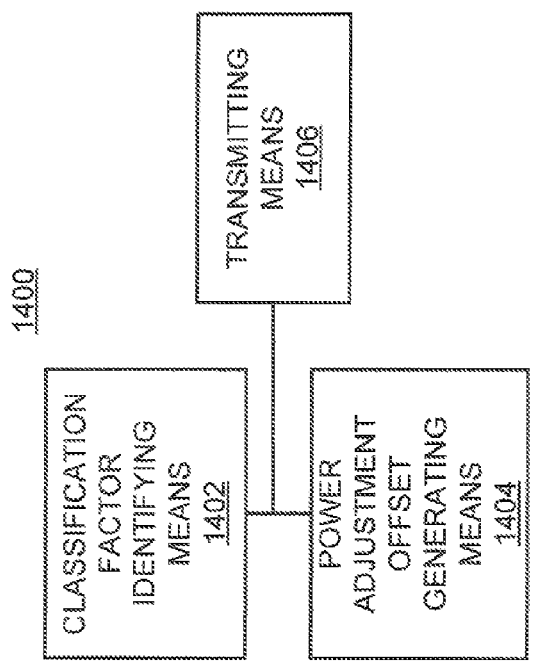
Figure 16:
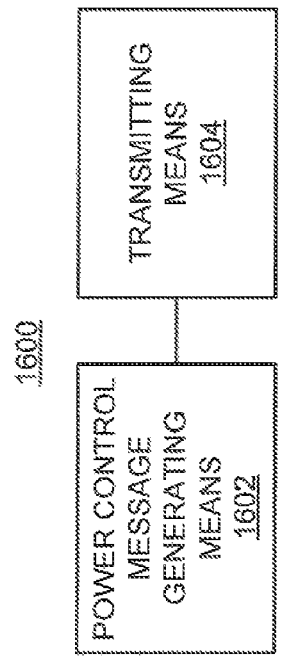

The teachings herein may be incorporated into a device employing various components for communicating with at least one other wireless device. FIG. 9 depicts several sample components that may be employed to facilitate communication between devices. Specifically, FIG. 9 illustrates a device 910 (e.g., access point) and a device 950 (e.g., a subscriber station) of a MIMO system 900. At the device 910, traffic data for a number of data streams is provided from a data source 912 to a transmit ("TX") data processor 914.

In some aspects, each data stream is transmitted over a respective transmit antenna. The TX data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a TX MIMO processor 920, which may further process the modulation symbols (e.g., for OFDM). The TX MIMO processor 920 then provides $N_T$ modulation symbol streams to $N_T$ transceivers ("XCVR") 922A through 922T. In certain embodiments, the TX MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 922A through 922T are then transmitted from $N_T$ antennas 924A through 924T, respectively.

At the device 950, the transmitted modulated signals are received by $N_R$ antennas 952A through 952R and the received signal from each antenna 952 is provided to a respective transceiver ("XCVR") 954A through 954R. Each transceiver 954 conditions (e.g., filters, amplifies, and downconverts) a respective received signal, digitizes the conditioned signal to provide samples, and further processes the samples to provide a corresponding "received" symbol stream.

A receive ("RX") data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the TX MIMO processor 920 and the TX data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the device 950.

The reverse link message may comprise various types of information regarding the communication link and/or the received data stream. The reverse link message is then processed by a TX data processor 938, which also receives traffic data for a number of data streams from a data source 936, modulated by a modulator 980, conditioned by the transceivers 954A through 954R, and transmitted back to the device 910.

At the device 910, the modulated signals from the device 950 are received by the antennas 924, conditioned by the transceivers 922, demodulated by a demodulator ("DEMOD") 940, and processed by a RX data processor 942 to extract the reverse link message transmitted by the device 950. The processor 930 then determines which pre-coding matrix to use for determining the beam-forming weights then processes the extracted message.

FIG. 9 also illustrates that the communication components may include one or more components that perform power control operations as taught herein. For example, a power control component 990 may cooperate with the processor 930 and/or other components of the device 910 to send/receive signals to/from another device (e.g., device 950) as taught herein. Similarly, a power control component 992 may cooperate with the processor 970 and/or other components of the device 950 to send/receive signals to/from another device (e.g., device 910). It should be appreciated that for each device 910 and 950 the functionality of two or more of the described components may be provided by a single component. For example, a single processing component may provide the functionality of the power control component 990 and the processor 930 and a single processing component may provide the functionality of the power control component 992 and the processor 970.

The teachings herein may be incorporated into (e.g., implemented within or performed by) a variety of apparatuses (e.g., devices). For example, some wireless devices may be configured or referred to as a Base Station ("BS"), an access point ("AP"), NodeB, Radio Network Controller ("RNC"), eNodeB, Base Station Controller ("BSC"), Base Transceiver Station ("BTS"), Transceiver Function ("TF"), Radio Router, Radio Transceiver, Basic Service Set ("BSS"), Extended Service Set ("ESS"), Radio Base Station ("RBS"), or some other terminology. Other wireless devices (e.g., wireless terminals) may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless device may comprise an access device (e.g., a cellular, Wi-Fi, or WiMAX access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi or WiMAX station) to access the network or some other functionality.

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 314 and 330 and receivers 308 and 318) that may include various components (e.g., signal generators and signal processors) that facilitate communication over a wireless medium.

The components described herein may be implemented in a variety of ways. Referring to FIGS. 10-17, apparatuses 1000, 1100, 1200, 1300, 1400, 1500, 1600, and 1700 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein.

The apparatuses 1000, 1100, 1200, 1300, 1400, 1500, 1600, and 1700 may include one or more modules that may perform one or more of the functions described above with regard to various figures. For example, a QoS identifying means 1002, an assignment location identifying means 1202, or a classification factor identifying means 1402 may correspond to, for example, the classifier 316 as discussed herein. An interference information obtaining means 1004 or 1204 may correspond to, for example, the interference controller 306 as discussed herein. An indication generating means 1006 or 1206 may correspond to, for example, the interference controller 306 as discussed herein. A transmitting means 1008, 1208, 1406, or 1604 may correspond to, for example, the transmitter 314 as discussed herein. A receiving means 1102, 1302, 1502, or 1702 may correspond to, for example, the receiver 318 as discussed herein. A QoS identifying means 1104, an assignment location identifying means 1304, or a classification factor identifying means 1504 may correspond to, for example, the classifier 324 as discussed herein. An indication selecting means 1106 or 1306 may correspond to, for example, the interference indication selector 326 as discussed herein. A transmit power defining means 1108, 1308, or 1704, or a transmit power adjusting means 1508 may correspond to, for example, the power controller 322 as discussed herein. A power adjustment offset generating means 1404 or a power control message generating means 1602 may correspond to, for example, the power controller 312 as discussed herein. A power adjustment offset selecting means 1506 may correspond to, for example, the power offset selector 328 as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may comprise RAM, ROM, EPROM, EEPROM, CD-ROM, flash memory, registers, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of power control for a wireless communication, comprising:
    identifying different quality of service classes associated with different traffic flows;
    obtaining other sector interference information associated with the different traffic flows, wherein the obtained other sector interference information indicates a degree of other sector interference caused by the different traffic flows with respect to one or more other sectors;
    generating different indications of interference for the different quality of service classes based on the obtained other sector interference information; and
    transmitting the different indications of interference associated with the different quality of service levels.

2. The method of claim 1, wherein the indications of interference comprise noise and interference values for an open loop power equation.

3. The method of claim 1, wherein each indication of interference comprises an incremental interference value.

4. The method of claim 1, further comprising identifying different classification factors associated with the different traffic flows, wherein:
    the different classification factors comprise at least one of the group consisting of: different assignments within a frame, different permutation zones, different channel differences, different locations of a wireless node, different channel types, different other sector interference values, and different assignment sizes; and
    the different indications of interference are further generated based on the identified different classification factors.

5. The method of claim 4, wherein the different channel types comprise at least two of the group consisting of: an acknowledgement channel, a CQI feedback channel, and a ranging channel.

6. The method of claim 4, wherein the permutation zones define wireless resource allocations based on at least one of the group consisting of: a time dimension, a frequency dimension, a space dimension, and a code dimension.

7. The method of claim 1, wherein the indications of interference are transmitted via unicast messages.

8. The method of claim 1, wherein the traffic flows comprise uplink traffic flows.

9. The method of claim 1, wherein the different traffic flows are associated with different connections.

10. The method of claim 1, wherein each of the different quality of service classes specifies a different throughput and/or latency requirement for any traffic flows associated with the quality of service class as compared to any traffic flows associated with any of the other different quality of service classes.

11. An apparatus for power control in a wireless communication, comprising:
    a classifier configured to identify different quality of service classes associated with different traffic flows;
    an interference controller configured to obtain other sector interference information associated with the different traffic flows, wherein the obtained other sector interference information indicates a degree of other sector interference caused by the different traffic flows with respect to one or more other sectors, and generate different indications of interference for the different quality of service classes based on the obtained other sector interference information; and a transmitter configured to transmit the different indications of interference associated with the different quality of service levels.

12. The apparatus of claim 11, wherein the indications of interference comprise noise and interference values for an open loop power equation.

13. The apparatus of claim 11, wherein:
the classifier is further configured to identify different classification factors associated with the different traffic flows;
the different classification factors comprise at least one of the group consisting of: different assignments within a frame, different permutation zones, different channel differences, different locations of a wireless node, different channel types, different other sector interference values, and different assignment sizes; and
the interference controller is further configured to generate the different indications of interference based on the identified different classification factors.

14. The apparatus of claim 11, wherein the transmitter is further configured to transmit the indications of interference via unicast messages.

15. The apparatus of claim 11, wherein the traffic flows comprise uplink traffic flows.

16. An apparatus for power control in a wireless communication, comprising:
means for identifying different quality of service classes associated with different traffic flows;
means for obtaining other sector interference information associated with the different traffic flows, wherein the obtained other sector interference information indicates a degree of other sector interference caused by the different traffic flows with respect to one or more other sectors;
means for generating different indications of interference for the different quality of service classes based on the obtained other sector interference information; and
means for transmitting the different indications of interference associated with the different quality of service levels.

17. The apparatus of claim 16, wherein the indications of interference comprise noise and interference values for an open loop power equation.

18. The apparatus of claim 16, wherein:
the means for identifying identifies different classification factors associated with the different traffic flows;
the different classification factors comprise at least one of the group consisting of: different assignments within a frame, different permutation zones, different channel differences, different locations of a wireless node, different channel types, different other sector interference values, and different assignment sizes; and
the means for generating generates the different indications of interference further based on the identified different classification factors.

19. The apparatus of claim 16, wherein the means for transmitting further transmits the indications of interference via unicast messages.

20. The apparatus of claim 16, wherein the traffic flows comprise uplink traffic flows.

21. A non-transitory computer-readable medium comprising code for causing a computer to:
identify different quality of service classes associated with different traffic flows;
obtain other sector interference information associated with the different traffic flows, wherein the obtained other sector interference information indicates a degree of other sector interference caused by the different traffic flows with respect to one or more other sectors;
generate different indications of interference for the different quality of service classes based on the obtained other sector interference information; and
transmit the different indications of interference associated with the different quality of service levels.

22. The non-transitory computer-readable medium of claim 21, wherein the indications of interference comprise noise and interference values for an open loop power equation.

23. The non-transitory computer-readable medium of claim 21, wherein:
the computer-readable medium further comprises code for causing the computer to identify different classification factors associated with the different traffic flows;
the different classification factors comprise at least one of the group consisting of: different assignments within a frame, different permutation zones, different channel differences, different locations of a wireless node, different channel types, different other sector interference values, and different assignment sizes; and
the computer-readable medium further comprises code for causing the computer to generate the different indications of interference based on the identified different classification factors.

24. The non-transitory computer-readable medium of claim 21, wherein the computer-readable medium further comprises code for causing the computer to transmit the indications of interference via unicast messages.

25. The non-transitory computer-readable medium of claim 21, wherein the traffic flows comprise uplink traffic flows.

26. A method of power control performed at a subscriber station for a wireless communication, comprising:
receiving different indications of interference associated with different quality of service classes, wherein the different indications of interference are based upon a degree of other sector interference caused by different traffic flows with respect to one or more other sectors;
identifying a quality of service class associated with a traffic flow being transmitted by the subscriber station;
selecting an indication of interference by determining which one of the received indications of interference is associated with the identified quality of service class;
wherein the indications of interference are further associated with different classification factors comprising at least one of the group consisting of: different assignments within a frame, different permutation zones, different channel differences, different locations of a wireless node, different channel types, different other sector interference values, and different assignment sizes;
the traffic flow is further associated with at least one of the different classification factors; and
the selection of the indication of interference further comprises determining which one of the received indications of interference is associated with the at least one of the different classification factors;

wherein the different channel types comprise at least two of the group consisting of: an acknowledgement channel, a CQI feedback channel, and a ranging channel; and
defining uplink transmit power for the traffic flow based on the selected indication of interference.

27. The method of claim 26, wherein the indications of interference comprise noise and interference values for an open loop power equation.

28. The method of claim 26, wherein each indication of interference comprises an incremental interference value.

29. A method of power control performed at a subscriber station for a wireless communication, comprising:
receiving different indications of interference associated with different quality of service classes, wherein the different indications of interference are based upon a degree of other sector interference caused by different traffic flows with respect to one or more other sectors;
identifying a quality of service class associated with a traffic flow being transmitted by the subscriber station;
selecting an indication of interference by determining which one of the received indications of interference is associated with the identified quality of service class; and defining uplink transmit power for the traffic flow based on the selected indication of interference
the indications of interference are further associated with different classification factors comprising at least one of the group consisting of: different assignments within a frame, different permutation zones, different channel differences, different locations of a wireless node, different channel types, different other sector interference values, and different assignment sizes;
the traffic flow is further associated with at least one of the different classification factors;
wherein the permutation zones define wireless resource allocations based on at least one of the group consisting of: a time dimension, a frequency dimension, a space dimension, and a code dimension; and
the selection of the indication of interference further comprises determining which one of the received indications of interference is associated with the at least one of the different classification factors.

30. The method of claim 26, wherein the indications of interference are received via unicast messages.

31. The method of claim 26, wherein the traffic flow comprises an uplink traffic flow.

32. A subscriber station for power control in a wireless communication, comprising:
a receiver configured to receive different indications of interference associated with different quality of service classes, wherein the different indications of interference are based upon a degree of other sector interference caused by different traffic flows with respect to one or more other sectors;
a classifier configured to identify a quality of service class associated with a traffic flow being transmitted by the subscriber station;
an indication selector configured to select an indication of interference by determining which one of the received indications of interference is associated with the identified quality of service class; and
a power controller configured to define uplink transmit power for the traffic flow based on the selected indication of interference.

33. The subscriber station of claim 32, wherein the indications of interference comprise noise and interference values for an open loop power equation.

34. The subscriber station of claim 32, wherein:
the indications of interference are further associated with different classification factors comprising at least one of the group consisting of: different assignments within a frame, different permutation zones, different channel differences, different locations of a wireless node, different channel types, different other sector interference values, and different assignment sizes;
the classifier is further configured to identify at least one of the different classification factors as being associated with the traffic flow; and
the indication selector is further configured to select the indication of interference by determining which one of the received indications of interference is associated with the at least one of the different classification factors.

35. The subscriber station of claim 32, wherein the indications of interference are received via unicast messages.

36. The subscriber station of claim 32, wherein the traffic flow comprises an uplink traffic flow.

37. A subscriber station for power control in a wireless communication, comprising:
means for receiving different indications of interference associated with different quality of service classes, wherein the different indications of interference are based upon a degree of other sector interference caused by different traffic flows with respect to one or more other sectors;
means for identifying a quality of service class associated with a traffic flow being transmitted by the subscriber station;
means for selecting an indication of interference by determining which one of the received indications of interference is associated with the identified quality of service class; and
means for defining uplink transmit power for the traffic flow based on the selected indication of interference.

38. The subscriber station of claim 37, wherein the indications of interference comprise noise and interference values for an open loop power equation.

39. The subscriber station of claim 37, wherein:
the indications of interference are further associated with different classification factors comprising at least one of the group consisting of: different assignments within a frame, different permutation zones, different channel differences, different locations of a wireless node, different channel types, different other sector interference values, and different assignment sizes;
the means for identifying identifies at least one of the different classification factors as being associated with the traffic flow; and
the means for selecting selects the indication of interference by further determining which one of the received indications of interference is associated with the at least one of the different classification factors.

40. The subscriber station of claim 37, wherein the indications of interference are received via unicast messages.

41. The subscriber station of claim 37, wherein the traffic flow comprises an uplink traffic flow.

42. A non-transitory computer-readable medium comprising code for causing a subscriber station to:
receive different indications of interference associated with different quality of service classes, wherein the different indications of interference are based upon a degree of other sector interference caused by different traffic flows with respect to one or more other sectors;

identify a quality of service class associated with a traffic flow being transmitted by the subscriber station;

select an indication of interference by determining which one of the received indications of interference is associated with the identified quality of service class; and define uplink transmit power for the traffic flow based on the selected indication of interference.

43. The non-transitory computer-readable medium of claim 42, wherein the indications of interference comprise noise and interference values for an open loop power equation.

44. The non-transitory computer-readable medium of claim 42, wherein:

the indications of interference are further associated with different classification factors comprising at least one of the group consisting of: different assignments within a frame, different permutation zones, different channel differences, different locations of a wireless node, different channel types, different other sector interference values, and different assignment sizes;

the computer-readable medium further comprises code for causing the computer to identify at least one of the different classification factors as being associated with the traffic flow; and the computer-readable medium further comprises code for causing the computer to select the indication of interference by determining which one of the received indications of interference is associated with the at least one of the different classification factors.

45. The non-transitory computer-readable medium of claim 42, wherein the indications of interference are received via unicast messages.

46. The non-transitory computer-readable medium of claim 42, wherein the traffic flow comprises an uplink traffic flow.

47. A method of operating a subscriber station, comprising:

receiving different indications of interference associated with different assignment locations within a frame for a given permutation zone;

identifying an assignment location associated with a traffic flow being transmitted by the subscriber station;

selecting an indication of interference by determining which one of the received indications of interference is associated with the identified assignment location; and defining uplink transmit power for the traffic flow based on the selected indication of interference.

48. The method of claim 47, wherein the different indications of interference include other sector interference information that indicates a degree of other sector interference caused by transmissions of the subscriber station on one or more of the different assignment locations to one or more other sectors.

49. A method of power control for a wireless communication, comprising:

generating a power control message; and transmitting the power control message in an assignment message for uplink transmissions, wherein the uplink transmissions are associated with a modulation coding scheme that has defined power levels wherein the power control message is contained within an uplink map within the assignment message, wherein the power control message is transmitted to a subscriber station, and wherein the uplink map defines which timeslots upon which the subscriber station can transmit.

50. The method of claim 49, wherein the assignment message corresponds to a frame assignment message.

51. A method of power control for a wireless communication, comprising:

receiving a power control message in an assignment message for uplink transmissions, wherein the uplink transmissions are associated with a modulation coding scheme that has defined power levels;

wherein the power control message is contained within an uplink map within the assignment message, wherein the power control message is received at a subscriber station, and wherein the uplink map defines which timeslots upon which the subscriber station can transmit; and defining transmit power for at least one of the uplink transmissions based on the received power control message.

52. A method of power control for a wireless communication, comprising:

identifying, at a base station, different quality of service classes associated with different traffic flows;

obtaining, at the base station, other sector interference information associated with the different traffic flows, wherein the obtained other sector interference information indicates a degree of other sector interference caused by the different traffic flows with respect to one or more other sectors;

generating, at the base station, different indications of the obtained other sector interference information for the different quality of service classes; and transmitting, from the base station, the different indications of the obtained other sector interference information associated with the different quality of service levels.

53. The method of claim 52, wherein each of the different quality of service classes specifies a different throughput and/or latency requirement for any traffic flows associated with the quality of service class as compared to any traffic flows associated with any of the other different quality of service classes.

54. The method of claim 52, wherein the transmitting transmits the different indications of the obtained other sector interference information associated with the different quality of service levels to one or more subscriber stations to facilitate reverse-link power control for the different traffic flows.

55. A method of power control for a wireless communication, comprising:

receiving, at a subscriber station, different indications of interference associated with different quality of service classes, wherein the different indications of interference are based upon a degree of other sector interference caused by the different traffic flows with respect to one or more other sectors;

identifying, at the subscriber station, a quality of service class associated with a traffic flow being transmitted by the subscriber station;

selecting, at the subscriber station, an indication of interference by determining which one of the received indications of interference is associated with the identified quality of service class; and defining, at the subscriber station, uplink transmit power for the traffic flow based on the selected indication of interference.

* * * * *